United States Patent
Bang et al.

(10) Patent No.: US 8,204,190 B2
(45) Date of Patent: Jun. 19, 2012

(54) APPARATUS AND METHOD FOR INTEGRATED BILLING MANAGEMENT BY REAL-TIME SESSION MANAGEMENT IN WIRE/WIRELESS INTEGRATED SERVICE NETWORK

(75) Inventors: Jung-Hee Bang, Seoul (KR); Gyung-Mo Kang, Seoul (KR); Young-Lan Cho, Seoul (KR); Jong-Hyun Lee, Seoul (KR)

(73) Assignee: KT Corporation, Seongnam (KR)

( * ) Notice: Subject to any disclaimer, the term of this patent is extended or adjusted under 35 U.S.C. 154(b) by 1412 days.

(21) Appl. No.: 11/694,641

(22) Filed: Mar. 30, 2007

(65) Prior Publication Data

US 2007/0226354 A1    Sep. 27, 2007

Related U.S. Application Data

(63) Continuation of application No. PCT/KR2005/003235, filed on Sep. 30, 2005.

(30) Foreign Application Priority Data

Sep. 30, 2004   (KR) ................. 10-2004-0078011

(51) Int. Cl.
*H04M 15/00* (2006.01)

(52) U.S. Cl. ............................. 379/114.03; 379/121.04
(58) Field of Classification Search ............ 379/112.01, 379/114.01, 114.03, 121.04, 122, 133, 136; 455/405–408

See application file for complete search history.

(56) References Cited

U.S. PATENT DOCUMENTS

| | | | | |
|---|---|---|---|---|
| 5,506,893 | A | * | 4/1996 | Buscher et al. .......... 379/115.02 |
| 6,052,671 | A | * | 4/2000 | Crooks et al. .................... 705/34 |
| 6,343,284 | B1 | | 1/2002 | Ishikawa et al. |
| 6,980,793 | B2 | * | 12/2005 | Lee ............................... 455/406 |
| 7,225,249 | B1 | * | 5/2007 | Barry et al. ................... 709/227 |
| 7,849,008 | B1 | * | 12/2010 | Ekker et al. ..................... 705/40 |
| 2003/0236874 | A1 | | 12/2003 | Hotti |

FOREIGN PATENT DOCUMENTS

| | | |
|---|---|---|
| CN | 1397125 A | 2/2003 |
| CN | 1458770 A | 11/2003 |
| JP | 10-150440 A | 6/1998 |
| JP | 2000-013371 A | 1/2000 |
| JP | 2002-158656 A | 5/2002 |

(Continued)

OTHER PUBLICATIONS

Office Action issued on Mar. 14, 2008 in corresponding Korean patent application No. 10-2004-0078011 in 5 pages.

(Continued)

*Primary Examiner* — Quoc D Tran
(74) *Attorney, Agent, or Firm* — Sughrue Mion, PLLC

(57) ABSTRACT

An apparatus and method of integrated billing management by real-time session management, and a computer readable medium thereof are provided. The integrated billing management apparatus performs billing management functions, that is, analyzes various messages related to the billing service request, manages sessions in real time, processes reliable billing information data and generates formulaic billing information. Then, the integrated billing management apparatus transmits the result of processing the billing service to the user terminal through the network access device. Therefore, the customer discontents can be responded in real time and customized billing management service based on the amount of service used can be provided form all wired and wireless network services.

16 Claims, 5 Drawing Sheets

FOREIGN PATENT DOCUMENTS

| | | | |
|---|---|---|---|
| JP | 2003-008660 A | 1/2003 |
| JP | 2003-134111 A | 5/2003 |
| JP | 2004-147284 A | 5/2004 |
| JP | 2005-506729 A | 3/2005 |
| JP | 2006-509430 A | 3/2006 |
| KR | 10-2001-0001199 A | 1/2001 |
| KR | 10-2002-0058559 A | 7/2002 |
| KR | 10-2003-0032006 A | 4/2003 |
| KR | 10-2004-0025222 A | 3/2004 |
| KR | 10-2004-0064081 A | 7/2004 |
| KR | 10-2004-0073085 A | 8/2004 |
| WO | 01/59990 A1 | 8/2001 |
| WO | 03084156 A1 | 10/2003 |

OTHER PUBLICATIONS

International Preliminary Report on Patentability dated Jan. 16, 2007 in PCT/KR2005/003235, which is the parent application of this application.

PCT Search Report regarding PCT application No. PCT/KR2005/003235 dated Dec. 29, 2005.

Office Action issued on Jul. 25, 2008 in corresponding Chinese Patent Application No. 200580041092.7 and its English translation in 10 pages.

Amano, "Creation of Wireless LAN Access Services", Unisys Technology Review vol. 23, No. 2, Aug. 31, 2003, pp. 68~81.

* cited by examiner

APPARATUS AND METHOD FOR INTEGRATED BILLING MANAGEMENT BY REAL-TIME SESSION MANAGEMENT IN WIRE/WIRELESS INTEGRATED SERVICE NETWORK

CROSS-REFERENCE TO RELATED PATENT APPLICATIONS

This application is a continuation application under 35 U.S.C. §365(c) of International Application No. PCT/KR2005/003235, filed Sep. 30, 2005 designating the United States. International Application No. PCT/KR2005/003235 was published in English as WO2006/080667 A1 on Aug. 3, 2006. This application further claims the benefit of the earlier filing dates under 35 U.S.C. §365(b) of Korean Patent Application No. 10-2004-0078011 filed Sep. 30, 2004. This application incorporates herein by reference the International Application No. PCT/KR2005/003235 including the International Publication No. WO2006/080667 A1 and the Korean Patent Application No. 10-2004-0078011 in their entirety.

BACKGROUND

1. Field

The present invention relates to an apparatus and method for integrated billing management in a wired/wireless integrated service network; and more particular, to an apparatus and method for integrated billing management by real-time session management in a wired/wireless integrated service network to systematically provide various service-charge plans based on the amount of network services used to each user on requesting the network service and to provide various customized billing services according to the amount of wired/wireless network services used, and a computer readable recording medium thereof.

2. Discussion of the Related Technology

A high-speed Internet service is provided to subscribers through a non real-time session management with a flat rate and thus, is not suitable to provide various customized and specialized network services to subscribers. Such an Internet service billing system allows a plurality of subscribers to access the Internet with one Identification (ID). Hence, various supplementary and application services or customized services cannot be provided to the subscribers. It is because an Internet service billing system does not includes a formulaic function of generating billing information according to an Internet-access or a supplementary service. Therefore, it is impossible to provide various billing service, to respond public resentments and to manage various customers and statistics processes in real-time based on the billing information.

Generally, a wireless Internet service is provided with a time based service-charge or a usage based service-charge through a session management function beside of the flat rate service-charge. However, a packet based service-charge is not provided. Furthermore, collected billing information is not reliably and accurately processed although it is a prior settlement to provide the Internet service with the usage-based service charge.

The discussion in this section is to provide general background information, and does not constitute an admission of prior art.

SUMMARY

It is, therefore, an aspect of the present invention to provide an apparatus and method for integrated billing management by real-time session management in a wired/wireless integrated service network to systematically provide various service-charge plans based on the amount of network services used according to each user on requesting the network service and to provide individually customized billing services based on the amount of wired/wireless network services used, and a computer readable recording medium thereof.

It is another aspect of the present invention to provides an apparatus and method for integrated billing management by real-time session management in a wired/wireless integrated service network to provide various billing functions to customers based on personal mobility by processing a billing service through various access networks regardless of a customer location, to reliably and accurately performing a service-charge process by maximizing a processing power of various billing services through unifying service charging structures of entire service providers and to provide scalability and modularity for extending the system or adopting loaming of other service providers.

In accordance with one aspect of the present invention, there is provided an apparatus for integrated billing management in a wired/wireless integrated service network, including: a billing information pre-processing unit for analyzing billing processing request information received from a user terminal through a network access device, transmitting the received billing processing request information to a session information processing unit and a billing information processing unit, receiving a processing result from the session information processing unit and the billing information processing unit, and transmitting the processing result to the network access device; a first session information processing unit for performing a real-time session management function by receiving billing processing request information from the billing information pre-processing unit; a first billing information processing unit for performing a billing process based on session information stored in a DB processing unit for billing processing request information received from the billing information preprocessing unit; and a DB processing unit for organizing databases with registration information, billing information, session information and management information and managing the organized databases by cooperating with the billing information pre-processing unit, the session information processing unit and the billing information processing unit.

In accordance with another aspect of the present invention, there is provided a method of integrated billing management by a real-time session management, the method including the steps of: a) registering a user as a service subscriber in response to the user' request of subscribing for network service and storing and managing registration information of the user; b) analyzing billing processing request information received from a user terminal through a network access device, performing a function of processing session information and a function of processing billing information in real time, and transmitting the result of processing through the network access device to the user terminal; and c) generating formulaic billing information based on the session information and the billing information processed in the step b).

The method may further include the step of: d) regularly transmitting the generated billing information according to a user identification (ID) and a session in response to a billing information request of a billing system; e) regularly transmitting the generated billing information according to a user identification (ID) and a session in response to a billing information request of a statistics system and a customer discontent system; and f) processing the billing information processed in the step b) in real time according to the request of the user if a billing information request from a user through a customer system, and transmitting the processed billing information to the user.

In accordance with still another aspect of the present invention, there is provided a computer readable recording medium storing a program that a method of integrated billing management by a real-time session management, the method including the steps of: a) registering a user as a service subscriber in response to the user' request of subscribing for network service and storing and managing registration information of the user; b) analyzing billing processing request information received from a user terminal through a network access device, performing a function of processing session information and a function of processing billing information in real time, and transmitting the result of processing through the network access device to the user terminal; and c) generating formulaic billing information based on the session information and the billing information processed in the step b).

The computer readable medium may further include: d) regularly transmitting the generated billing information according to a user identification (ID) and a session in response to a billing information request of a billing system; e) regularly transmitting the generated billing information according to a user identification (ID) and a session in response to a billing information request of a statistics system and a customer discontent system; and f) processing the billing information processed in the step b) in real time according to the request of the user if a billing information request from a user through a customer system, and transmitting the processed billing information to the user.

The apparatus and method for integrated billing management by real time session management according to an embodiment of the present invention provide systematic billing services customized according to individual through various different access networks, i.e., ADSL, VDSL and Wireless LAN employing IEEE 802.1X, while processing high-speed Internet service. According an embodiment of to the present invention, various billing functions based on an amount of network service used are provided to users. Also, the network service providers can obtain the real-time session management function that can provide diverse service charge plans such as a usage based service charge (time, byte or packet), a semi fixed rate service charge and an interim settlement service charge and the real time customer discontent response function. Furthermore, billing for all wired/wireless network service provided from one network service provider can be customized to each individual.

Also, the apparatus and method for integrated billing management by real time session management according to an embodiment of the present invention allow the subscriber to use customized billing service through reliable and various billing functions, and allow the network service providers to provide various billing policies and service-charge plans. That is, the apparatus and method for integrated billing management by real time session management according to an embodiment of the present invention can be used as a platform for the network service provider that allows loaming services to be linked to other network service providers such as mobile communication service providers and wireless LAN service providers. Therefore, scalable services can be provided to new subscriber instantly, and distinguishable services can be also provided to the subscribers as well as the new subscribers. As a result, the network service provider can have high competitive power by firmly holding a new market of wireless Internet service.

In order to embody the real-time session management and various billing policies, an embodiment of the present invention provides the session management function for collecting account information per ID without duplicated, the account information processing function for interim settlement, the function for processing packets omitted while processing accounting information between the network access devices, the information processing function for recognizing a reason of abnormal ending through the function for preventing billing omission in case of abnormal ending, the function for reorganizing the amount of service used per a session as data, the function for generating internet protocol detail record (IPDR) as accounting information that is analyzed and processed by the session based on ID and the function for generating formulaic billing information thereby. Therefore, an embodiment of the present invention provides various charging and billing functions to users.

That is, the customers discontents can be responded rapidly and accurately by providing the session management function for collecting reliable information about the amount of service used and collecting account information per ID without duplicated in real time and the billing information management function for recognizing various reasons even in abnormal network conditions and collecting the billing information through retransmitting and for interim settlement. Also, an embodiment of the present invention allows the subscriber to use various billing and charging functions through generating data according to the amount of service used per a session, analyzing the session information per ID and generating the formulaic billing information based on the processed billing information. Furthermore, an embodiment of the present invention provides various customer management functions by accurately recording details of billing information for all network services including supplementary and application services provided from the network service provider and generating various information for various billing functions based on the amount of service used by the user according to the recorded details.

Also, according to an embodiment of the present invention, the information is generated according to the ID/session for providing various billing functions according to the amount of service used by recording the details of billing information for all access service and supplementary/application services provided form the network service provider. Therefore, various customer management functions are provided.

Furthermore, various billing functions customized to each subscriber are provided to the customers based on personal mobility and the processing power of managing various billing services is maximized through unifying billing structures. Therefore, the reliable and accurate billing processing function is provided to the network service provider. In addition, scalability and modularity are provided for system extending and linking of roaming to other network service providers such as mobile communication provider and wireless LAN provider.

Moreover, an embodiment of the present invention is a centralized type integrated billing management apparatus providing customized and systematic billing services to subscribers who request the Internet services in real time through a wired and a wireless communication network. Therefore, reliable service and personal mobility are guaranteed to the customer and various reliable billing services are also provided without reorganization of the network while the network access service and supplementary/application services are provided. In addition, the network load and the system load are reduced by separately embodying the billing system from the authentication system. Therefore, efficiency of the network is improved.

In addition, an embodiment of the present invention provides functions for real-time inquiring the amount of service used and for managing various billing service histories in order to provide various billing management services to the users. In addition, integrated billing function is provided for charging all network services including supplementary and application services.

According to an embodiment of the present invention, the functions for the registration and the billing management are provided in centralized fashion for consistently providing the maintenance and management functions of all network service providers for billing corresponding services while providing the wired/wireless network services. Therefore, reliable billing services can be provided to the subscribers, and the network service provider gains high economic benefits through providing scalable, usable, and diverse billing service. Also, the network operator can receive high usable services through the centralized operation.

According to an embodiment of the present invention, the formulaic billing information per the ID/session is generated for access and application services. Therefore, the customer discontents can be responded in real time and customized billing management service can be provided form all wired and wireless network services.

BRIEF DESCRIPTION OF THE DRAWINGS

The above and other aspects and features of the present invention will become apparent from the following description of the embodiments given in conjunction with the accompanying drawings, in which.

DETAILED DESCRIPTION OF EMBODIMENTS

Other features and aspects of the invention will become apparent from the following description of the embodiments with reference to the accompanying drawings, which is set forth hereinafter.

Figure 1:
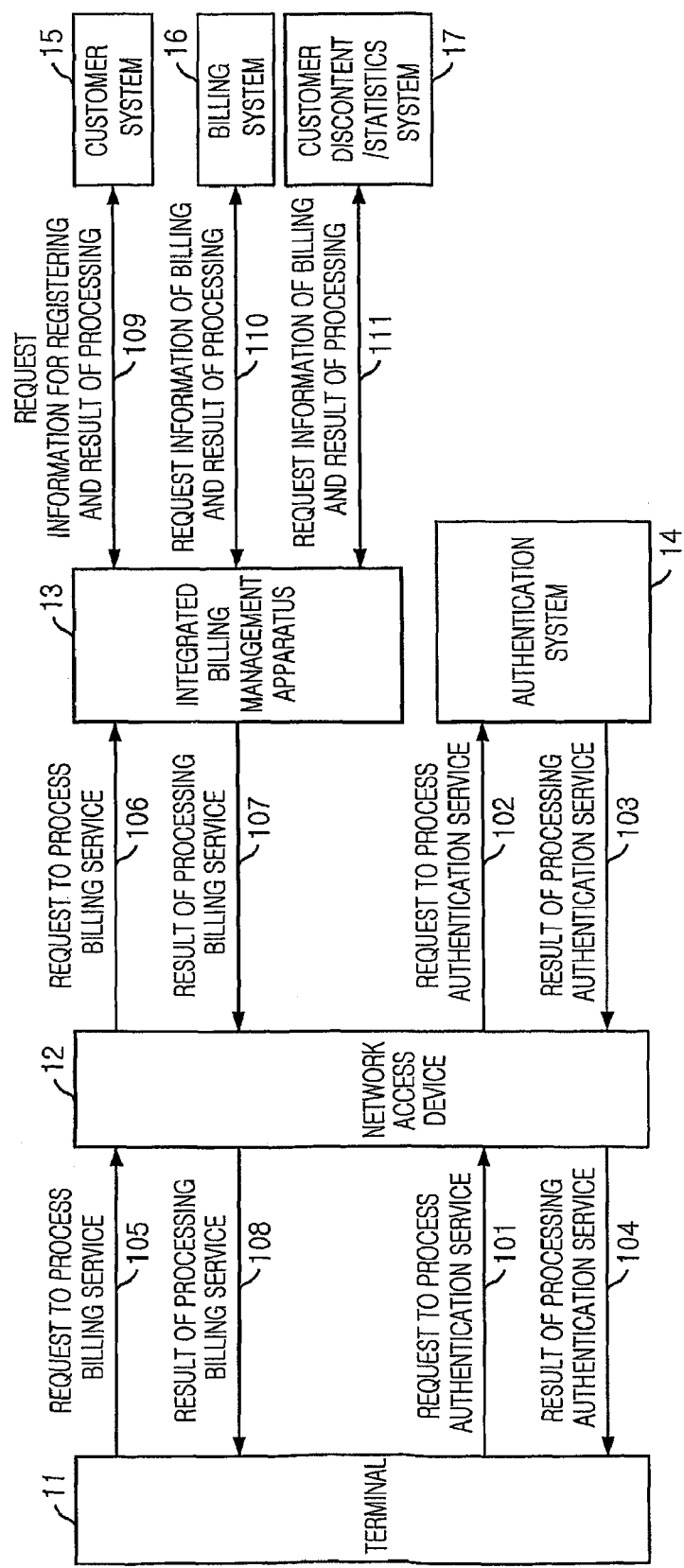
FIG. 1 is a block diagram showing a wired/wireless integrated service network for an embodiment of the present invention.

FIG. 1 is a block diagram showing a wired/wireless integrated service network for an embodiment of the present invention.

Wired/wireless network services are provided to various user terminals through diverse access networks. Such wired/wireless network services can request an authentication service and a corresponding billing service using network access devices. Such a request of the authentication and billing service is processed through four procedures, that is, a registration procedure for registering for a network service, an authentication procedure for processing and controlling authentication processes, a billing procedure for charging a cost of processed services to the subscriber and a management procedure for performing various management processes for the processed services.

An embodiment of the present invention relates to the billing procedure for providing various billing functions and it will be described in detail, hereinafter.

When a user subscribes for the network service, the user is provided with various service-charge plans such as a fixed rate service charge, a usage based service charge, a time based service charge and an interim settlement service charge in order to provide individually customized services to the users. The user is allowed to select one of the service-charge plans. An embodiment of the present invention provides functions to process those service-charge planes. Before the user selects the one of the service-charge plans, the user must be authenticated.

In case of a wireless network, the authentication service is requested using an EAP based Internet service through a terminal equipping a wireless LAN card such as a notebook computer or a PDA. In case of a wired network, the authentication service is requested through a desktop computer, generally. Then, a network access device 12 receives the authentication service request (101) and transfers the authentication service request to an authentication system 14.

The authentication system 14 performs a sequence of operations for processing the authentication service request and transmits the result of processing the authentication service to the user terminal 11 through the network access device 12. In case of a pre-paid usage based charge service, the authentication system 14 transmits the processing result of the authentication service request to the user terminal 11 through the network connecting device 12 by cooperating with an integrated billing management apparatus 13 (103, 104).

After the user is successfully authenticated, the user is allowed to access the Internet. At the same time, the billing procedure is performed. That is, a request of processing a billing service, which denotes beginning of network access, is transmitted to the integrated billing management apparatus 13 through various network access devices 12.

The integrated billing management apparatus 13 performs billing management functions, that is, analyzes various messages related to the billing service request, manages sessions in real time, processes reliable billing information data and generates formulaic billing information. Then, the integrated billing management apparatus 13 transmits the result of processing the billing service to the user terminal 11 through the network access device 12 (107, 108). The generated formulaic billing information through the real-time session management is provided to a billing system 16 for billing a cost of using the network services to the user and also provided to a customer discontent and statistics processing system 17 for responding customer discontents and processing statistic information related to the billing (111).

In order to provide the above described functions, the subscriber transmits a registration request message to the integrated billing management apparatus 13 by cooperating with a customer management system 15 (109). Then, the integrated billing management apparatus 13 stores registration information in a database with the billing information and transmits the processing result of the registration request to the customer management system 15 (105).

Figure 2:
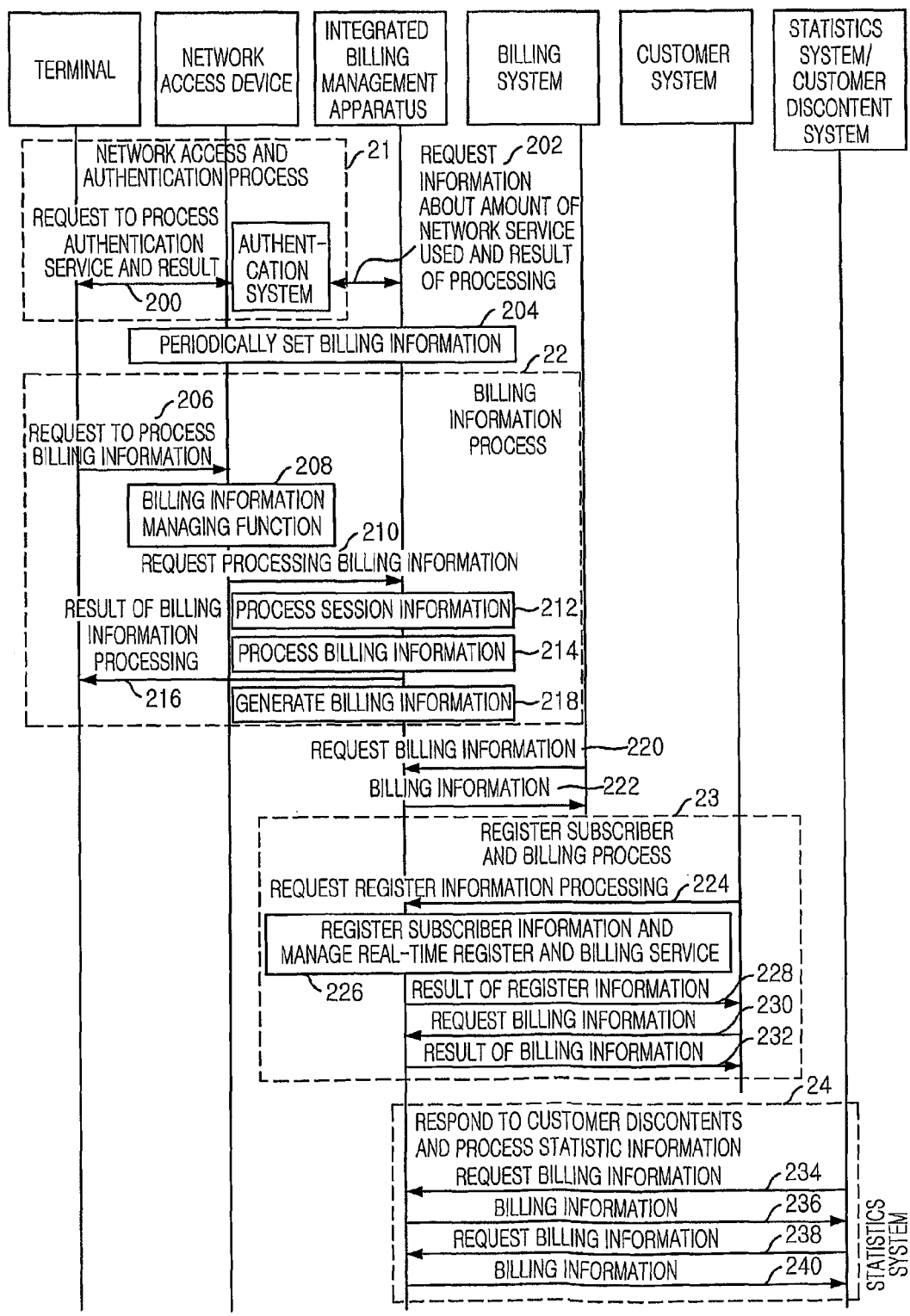
FIG. 2 is a flowchart describing a method of an integrated billing management by a real-time session management in a wired/wireless integrated service network in accordance with an embodiment of the present invention.

FIG. 2 is a flowchart describing a method of an integrated billing management by a real-time session management in a wired/wireless integrated service network in accordance with an embodiment of the present invention.

A session and billing information processing procedure and a formulaic billing information generating procedure are major processing steps in the method of an integrated billing management according to an embodiment of the present invention.

As shown in FIG. 2, the method of an integrated billing management by a real-time session management includes a network accessing and an authentication procedure 21, a billing information processing procedure 22, a registration and billing inquiring procedure 23 and a customer discontent and statistics processing procedure 24.

At first, the network accessing and the authentication procedure 21 authenticates a user based on user information through various user terminals such as a wired terminal and a wireless terminal.

The user transmits a request for processing a authenticating of a network access to the authentication system 14 using the user terminal 11 through the network access device 13 that performs an authentication client function. Then, the authentication system transmits an approval message for allowing the network access or a disapproval message for disallowing the network access to the user terminal 11 according to a result of the authentication function at step S200. In case of the user with a pre-paid usage based service charge plane, a balance inquiring function is performed at step S202 for inquiring a balance of a corresponding account of the subscriber for network service by cooperating with the integrated billing management apparatus and the processing result of the authentication of the network access is determined according to the balance inquiring result. That is, the authentication of the user may be approved or disapproved according to the balance inquiring result. Furthermore, in case of a pre-pay charge, the amount of network service used is accumulated in real-time.

Secondly, the billing information processing procedure 22 will be described, hereinafter.

After finishing the authentication procedure, the user terminal transmits various requests of processing billing information to the network access device 12 when the user 11 begins to access the network.

Then, the network access device 12 performs a sequence of billing information management operations such as determining whether or not a packet has been transmitted or received for a predetermined time in case of an abnormal ending among billing information processing messages (billing process request information) at step S208 and transmits a billing information processing message (billing processing request information) at step S210.

The integrated billing management apparatus 13 analyzes the received messages, performs a real-time session information management function at step S212 and performs a billing information management function at step S214. Then, the processing results thereof are transmitted to the user terminal through the network access device at step S216.

In order to process the received billing information in the billing information processing procedure 22, the integrated billing management apparatus previously sets transmission intervals for a network access intermediate message, a network re-access message and a packet at step S204.

The integrated billing management apparatus generates formulaic billing data based on the processed session and billing information at step S218 and regularly transmits billing information classified by a session or an ID at step S222 when the billing system requests the billing information at step S220.

The generated billing information is fundamental information to perform operations of the customer discontent and statistics processing procedure 24. In more detail, if the user inquires a service cost charged thereto to the integrated billing management apparatus through the customer discontent system at step S234, the integrated billing management apparatus transmits the result of the inquire, i.e., the billing information classified by the session or the ID, to a customer discontent system at step S236. Also, if the integrated billing management apparatus receives a request of billing information from a statistics processing system at step S238, the integrated billing management apparatus transmits the result thereof, i.e., billing information, to the statistics processing system at step S240.

In order to process the above described functions, the user must be previously registered through the registration and billing inquiring procedure 23. Hereinafter, the registration and billing inquiring procedure 23 will be described in detail.

At first, the user transmits a request message to process user information for registration with billing information to the integrated billing management apparatus by cooperating with the customer management system when the user subscribes for the service at step S224. Then, the integrated billing management apparatus stores the registration information and billing information of the user in a database at step S226 and transmits the result thereof, i.e., processing result of registration information, to the customer management system at step S228.

The integrated billing management apparatus receives the request of user's billing information from the customer management system for processing real-time inquiring of information related to the billing at step S230, the integrated billing management apparatus processes the billing information obtained in the step S214 according to the user's request and transmits the result of processing at step S232.

Figure 3:
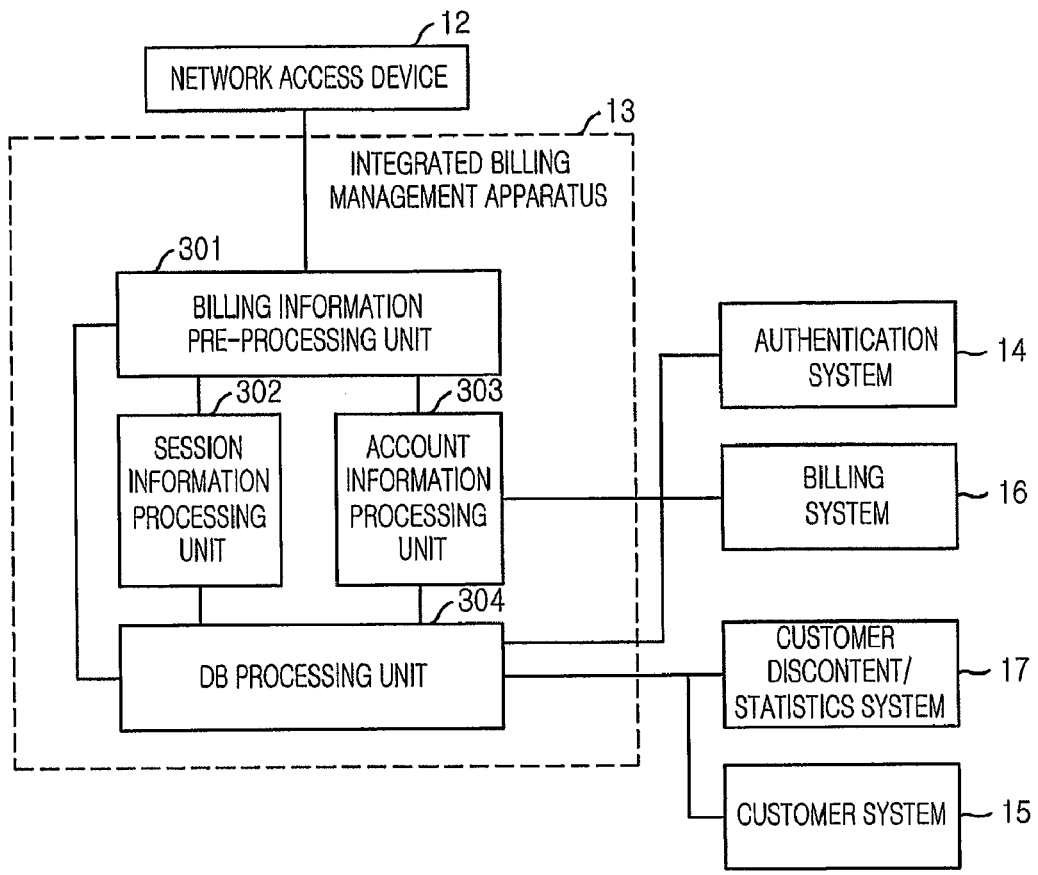
FIG. 3 is a block diagram illustrating an apparatus for an integrated billing management by a real-time session management in a wired/wireless integrated service network in accordance with an embodiment of the present invention.

FIG. 3 is a block diagram illustrating an apparatus for an integrated billing management by a real-time session management in a wired/wireless integrated service network in accordance with an embodiment of the present invention. As shown in FIG. 3, the integrated billing management apparatus includes a billing information preprocessing unit 301, a session information preprocessing unit 302, a billing information preprocessing unit 303 and a DB preprocessing unit 304.

The network access device performs the authentication and billing client functions and additionally processes authentication and billing messages.

An embodiment of the present invention related to a method of processing and managing messages of requesting a billing service after approving the authentication of the user excepting the authentication function. That is, an embodiment of the present invention provides a platform for providing various real-time billing message processing functions as well as various billing services and related functions.

At first, it is possible to provide various service-charge plans by performing real-time session management for a subscriber. Those various service-charge plans are dynamically provided according to a method of processing billing messages. In an embodiment of the present invention, the billing messages are classified into seven messages and processed in real time. The seven messages are 1) an network access begin message, 2) a network access end message, 3) a network access intermediate message, 4) a rebooting message, 5) a network re-access message, 6) an error message representing a network fail or abnormal end with an un-known reason and 7) a noticing message for noticing of no packet for a predetermined time. Based on the classifying result, various session and billing processing functions are provided.

The network access device 12 cooperates with the integrated billing management apparatus 3 to process information thereof and receives the processing result from the integrated billing management apparatus 13.

The billing information pre-processor 301 receives information of billing processing request from the network access device 12 and analyzes the received information. Then, the billing information pre-processor 301 transmits the information of billing processing request to the session information preprocessing unit 302 and the billing information preprocessing unit 303. Also, the billing information pre-processor 301 receives the processing results from the session information preprocessing unit 302 and the billing information preprocessing unit 303, and transmits the received processing results to the network access device. Furthermore, the billing information pre-processor 301 cooperates with a billing information manager 402 that sets and manages a retransmission interval, a transmission interval for a network access intermediate message and a packet transmission interval for transmitting the network access intermediate message, the network re-access message and the packet.

The session information preprocessing unit 302 performs a real-time session management when the billing processing request information is received from the billing information pre-processor 301. That is, the session information preprocessing unit 302 performs the real-time session management function and the session overlapping management function in order to collect accounting information per an ID without duplicated and to prevent overlapped log-in. Also, the session information preprocessing unit 302 updates or deletes the session information in real-time for the network access intermediate message and the rebooting message and stores the result thereof in the DB preprocessing unit 304.

The billing information preprocessing unit 303 performs a billing management function when the billing information preprocessing unit 303 receives the error message representing the network fail or abnormal ending with an un-known reason and the noticing message for noticing of no packet for a predetermined time. That is, the billing information preprocessing unit 303 distinguishes and processes an accounting message transmitted after normally processed. Also, the billing information preprocessing unit 303 performs a classifying process according to a time of re-accessing. Furthermore, the billing information preprocessing unit 303 performs a billing information management function for requests of re-access caused by un-allocation of an IP or by temporal network fail. Then, the result of performing the billing information management function is transmitted to the billing information pre-processor 301. Moreover, the billing information preprocessing unit 303 corrects the billing information classified by an ID or a session based on the real-time session information stored in the DB preprocessing unit 304 through analyzing the billing information regularly or in real time, reconfigures or generates data for amount of service used per a session and stores the generated data of the amount of service used. If the billing system requests the generated data for the amount of service used, it is transmitted to the billing system.

The DB preprocessing unit 304 organizes management information for billing management information by cooperating with the billing information pre-processor 301 and organizes real-time session information of subscribers by cooperating with the session information preprocessing unit 302. Also, the DB preprocessing unit 304 organizes billing information and billing history information for error information by cooperating with the billing information preprocessing unit 303 and organizes a registration information database including billing service information by cooperating with the customer management system.

Therefore, the integrated billing management apparatus performs functions of responding various customer discontents by cooperating with the statistics system, the custom discontent system and the authentication system based on the fundamental information organized in the DB preprocessing unit 304. Especially, the integrated billing management apparatus also performs a function for approving or disapproving the authentication of the user based on the stored session information in case of pre-paid usage based service-charge. That is, a DBMS 702 is configured of a registration information database including billing function, a billing information database for billing history, a session information database for session and a management information database for managing the billing service.

Figure 4:
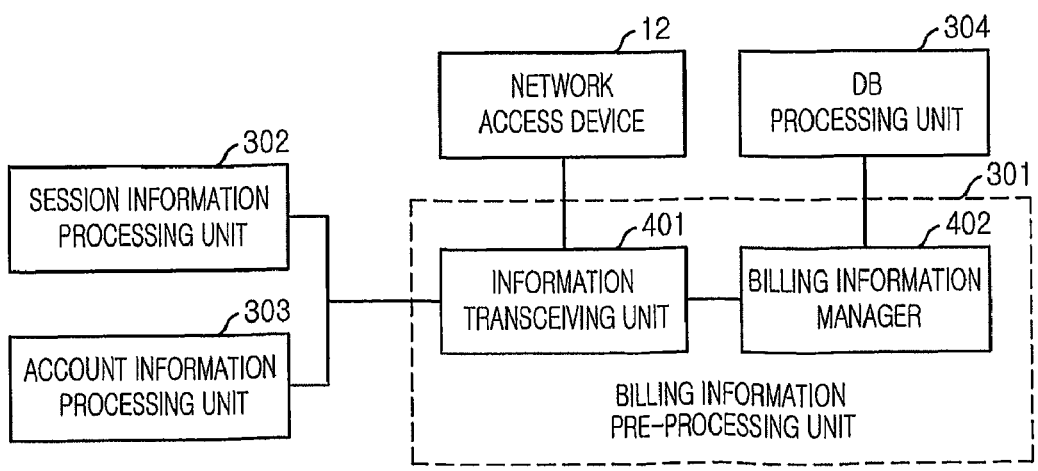
FIG. 4 is a block diagram of a billing information preprocessor of FIG. 3.

FIG. 4 is a block diagram of a billing information pre-processor of FIG. 3. As shown, the billing information pre-processor 301 includes an information transceiver 401 and a billing information manager 402.

The information transceiver 401 transmits or receives information of a network access billing processing request based on a billing protocol. That is, the information transceiver 401 receives the information of the network access billing processing request from the network access device 12, analyzes the received information and transmits the received information to the session information preprocessing unit 302 and the billing information preprocessing unit 303 according to the billing information. Then, the information transceiver 401 receives the processing result thereof from the session information preprocessing unit 302 and the billing information preprocessing unit 303 and transmits the received processing result to the network access device 12.

Also, the information transceiver 401 performs functions of setting and managing the retransmission interval, the transmission interval for the network access intermediate message and the transmission interval for packet in order to process the network access intermediate message, the network re-access message and the packet information. Such an operation is performed through cooperating with the billing information manager 402.

The billing information manager 402 provides management functions of setting and changing the retransmission interval, the transmission interval for the network access intermediate message and the packet transmission interval for the information transceiver 401 to process the network access intermediate message, the network re-access message and the packet information. That is, the information transceiver 401 performs a management function for previously and dynamically setting the interval for transmitting the billing information for various billing processes through cooperating with the network access device. As a result, the billing information becomes the basic information used in responding the customer discontent and processing statistics information. That is, the billing information manager 402 manages to dynamically set the transmission interval of the billing processing request information.

Figure 5:
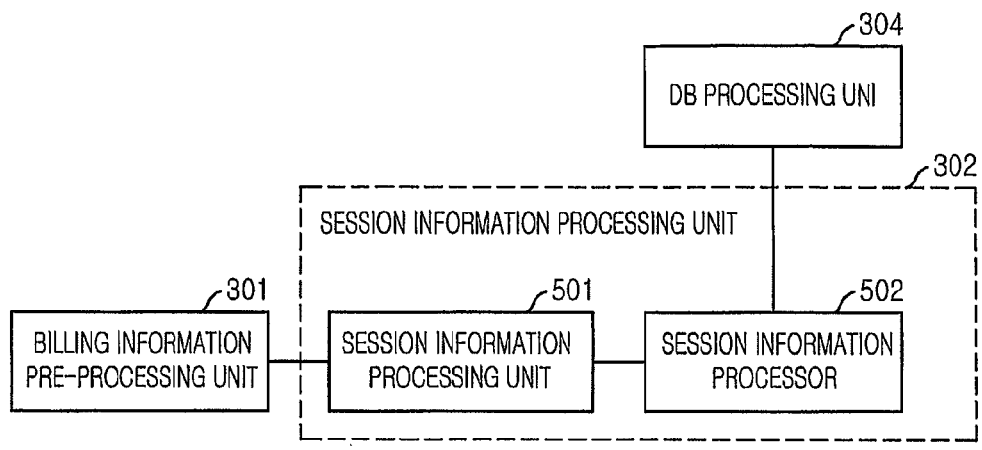
FIG. 5 is a block diagram of a session information processor of FIG. 3.

FIG. 5 is a block diagram of a session information processor of FIG. 3. As shown, the session information preprocessing unit 302 includes a session information transceiver 501 and a session information processor 502.

The session information transceiver 501 receives the billing information of 1) a network access begin message, 2) a network access end message, 3) a network access intermediate message and 4) rebooting message from the billing information pre-processor 301. Then, the session information transceiver 501 analyzes and transmits the received information to the session information processor 502, receives the result of processing from the session information processor 502 and transmits the processing result to the billing information pre-processor 301.

The session information processor 502 maintains, deletes or updates session information in real time according to a type of the received billing request information. The session information processor 502 performs a function of updating the session information with information collected at the interval when the network access intermediate message is received for the interim settlement service charge. Also, the session information processor 502 generates session information according to a corresponding ID when the network access begin message is received because a new user accesses the service network. Furthermore, the session information processor 502 provides a function of preventing the overlapped log-in in real time. Moreover, the session information processor 50 provides a function of preventing simultaneous accessing of two users with one ID and a function of disconnecting a user who access the service network earlier and allowing a user who access the service network later to be accessed.

Figure 6:
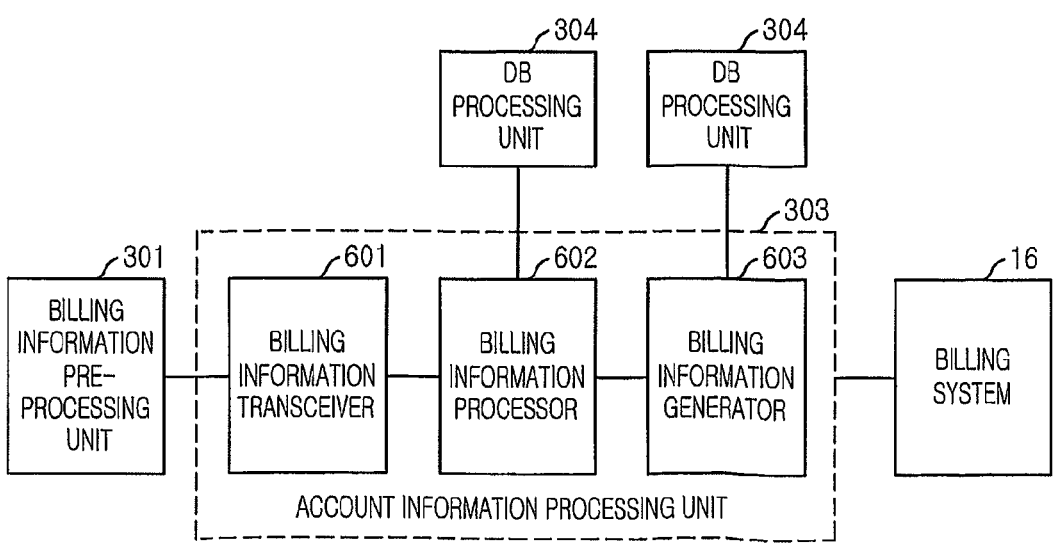
FIG. 6 is a block diagram of a billing information processor of FIG. 3.

FIG. 6 is a block diagram of a billing information processor of FIG. 3. As shown, the billing information preprocessing unit 303 includes a billing information transceiver 601, a billing information processor 602 and a billing information generator 603.

The billing information transceiver 601 receives the network access billing information as 1) a network re-access message, 2) an error message for the network fail and abnormal ending caused by an un-known reason, and 3) a noticing message for noticing of no packet for a predetermined time from the billing information pre-processor 301 and transmits the received network access billing information to the billing information processor 602. Also, the billing information transceiver 601 receives the result of processing from the billing information processor 602 and transmits the received result to the billing information pre-processor 301.

The billing information processor 602 analyzes the received information from the billing information transceiver 601. If the received information is the network re-access message, the billing information processor 602 distinguishes and processes an accounting message transmitted after normally processed, and performs a classifying process according to the time of re-accessing. Furthermore, the billing information processor 602 performs a billing information management function for re-accessing according to re-access requests by un-allocation of IP or by temporal network fail.

Furthermore, when the error message for noticing network fail and abnormal ending caused by an un-known reason is received, the billing information processor 602 generates basic information to be used for the billing information generation and the customer discontent response by converting the received message to codes. If the noticing message for noticing of no packet for a predetermined time is received, the billing information processor 602 performs a billing management function not to charge abnormally or not to omit the service charge. After performing the billing management function, the result thereof is stored in the database DB of the DB preprocessing unit 304.

The billing information generator 604 classifies data according to the service-charge plans according to the billing information and the collected session. Then, the billing information generator 604 extracts and corrects unstable data from the classified data and reassembles the amount of service used classified by a session to the amount of service used classified by an ID/session. Then, the billing information processor 604 organizes a database therewith and generates the information in a formulaic data format. The billing information generator 604 generates the basic billing information to be used to bill the subscriber by cooperating with the billing system, regularly.

Figure 7:
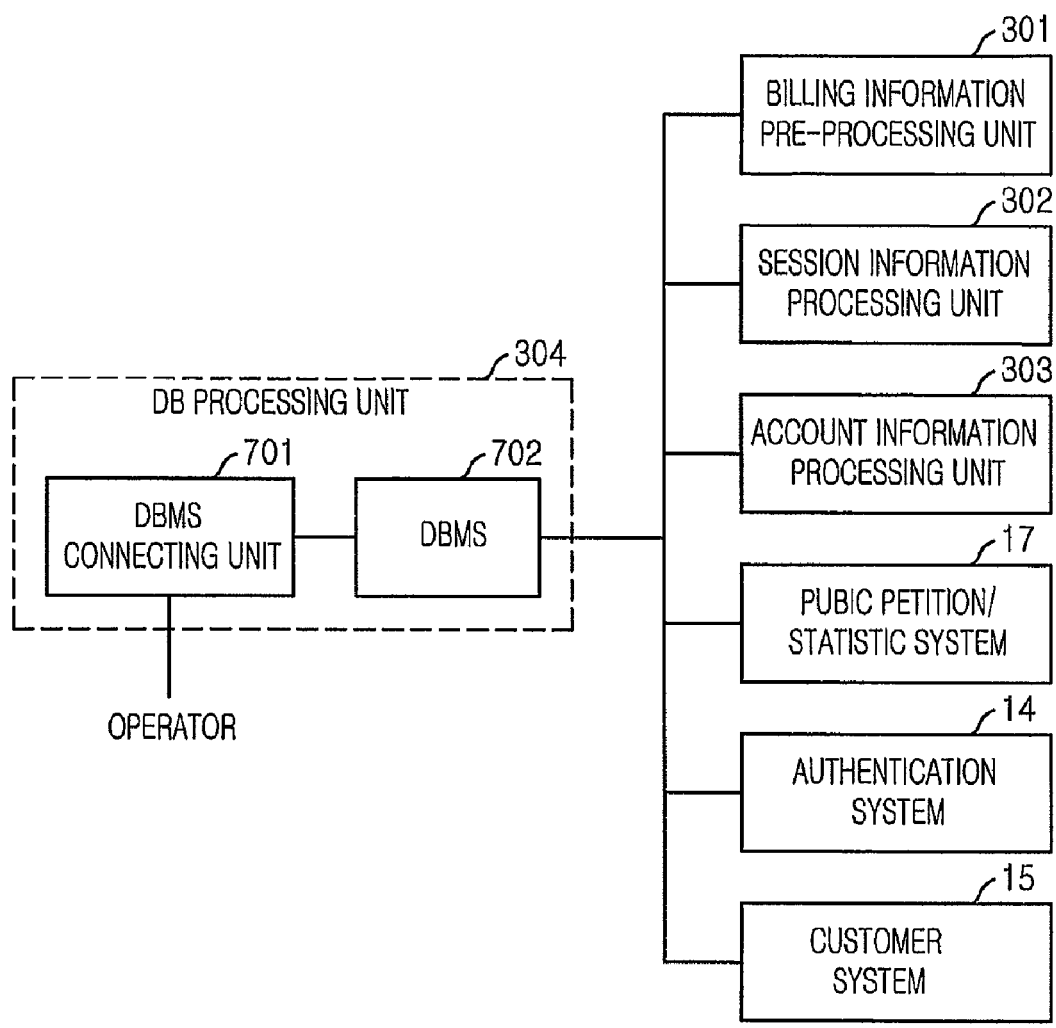
FIG. 7 is a block diagram of a DB processor of FIG. 3.

FIG. 7 is a block diagram of a DB processor of FIG. 3. As shown, the DB preprocessing unit 304 includes a DBMS connector 701 and a DBMS 702.

The DBMS connector 701 provides a history management function for managing the session and the billing information. That is, the DBMS connector 701 provides various management related functions using a user's SQL file or a Web function and a DBMS interface function. Also, the DBMS connector 701 analyzes a context and a syntax of a command inputted from an operator. If the command is normal, corresponding operations are performed according to the corresponding command. If not, an error message is provided.

The DBMS connector 701 provides an instant execution and a reserved execution as a method of performing operations of the command and stores the result thereof in the history database as the system access history after performing the operations of the command in order to use the history database later.

The DBMS 702 organizes a registration information database with the registering information such as subscriber information and billing information by cooperating with the customer management system and configures a session information database to perform a session management by cooperating with the session information preprocessing unit 302. Also, the DBMS 702 organizes a billing history database for managing billing information history by cooperating with the billing information preprocessing unit 303 and organizes a billing information database using the generated billing information per ID/session.

Therefore, the DBMS 702 provides various functions for responding customer discontents and processing statistics information by cooperating with the customer discontent and statistics processing system based on the collected or organized databases. Also, the DBMS 702 provides basic billing information to allow the authentication function only when usable amount (time/packet/byte) of service is left in case of the pre-paid usage based service charge by cooperating with the authentication system.

The above described method according to an embodiment of the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2004-78011, filed in the Korean Intellectual Property Office on Sep. 30, 2004, the entire contents of which is incorporated herein by reference.

While embodiments of the present invention has been described, it will be apparent to those skilled in the art that various changes and modifications may be made without departing from the scope of the invention as defined in the following claims.

What is claimed is:

1. An apparatus for integrated billing management in a wired/wireless integrated service network, comprising:

billing information pre-processing means for analyzing billing processing request information received from a user terminal through a network access device, transmitting the received billing processing request information to a session information processing means and a billing information processing means, receiving a processing result from the session information processing means and the billing information processing means, and transmitting the processing result to the network access device;

first session information processing means for receiving billing processing request information from the billing information pre-processing means, and performing a real-time session management function and a session overlapping management function based on type of the received billing processing request information in order to perform billing processing per a user without being duplicated;

first billing information processing means for performing a billing process based on session information stored in a DB processing means for billing processing request information received from the billing information pre-processing means; and DB processing means for organizing databases with registration information, billing information, session information and management information and managing the organized databases by cooperating with the billing information pre-processing means, the session information processing means and the billing information processing means;

wherein the first billing information processing means classifies data according to service-charge plans, and generates formulaic billing data, based on the session information and the billing information.

2. The apparatus as recited in claim 1, wherein the billing information pre-processing means includes:

information transceiving means for receiving billing processing request information from the network access device, analyzing the received billing processing request information, transmitting the received billing processing request information to the first session information processing means and the first billing information processing means according to billing information, receiving a corresponding result of processing from the first session information processing means and the first billing information processing means, transmitting the received result of processing to the network access device, and setting and managing a retransmission interval, a transmitting interval for a network access intermediate message and a packet transmitting interval to process a network access intermediate message and a network re-access message or to process packet information by cooperating with the first billing information management means; and the first billing information management means for managing the information transceiving means to dynamically set a transmission interval of billing service request information by cooperating with the DB processing means.

3. The apparatus as recited in claim 1, wherein the session management of the first session information processing means performs a real time session management function and an overlapped session management function for collecting accounting information per a ID (identification) without duplicating and for preventing overlapped log-in, and updates or deletes session information in real time for a network access intermediate message and a reboot message in the billing service request information and stores the result in the DB processing means.

4. The apparatus as recited in claim 3, wherein the first session information processing means includes:

session information transceiving means for receiving billing service request information corresponding to a network access begin message, a network access ending message, a network access intermediate message and a re-booting message from the billing information pre-processing means, analyzing the received billing service request information, transmitting the received billing service request information to a second session information processing means, receiving the result of processing from the second session information processing means and transmitting the received result to the billing information pre-processing means; and the second session processing means for maintaining, deleting, and updating session information in real time according to a type of the received billing service request information.

5. The apparatus as recited in claim 4, wherein the second session information processing means performs a function of updating session information with information collected at an interval when a network access intermediate message is received for an interim settlement, performs a function of deleting session information according to corresponding ID (identification) when a network access end message and a rebooting message are received, generates session information per a corresponding ID when a network access begin message is received, and providing a function of preventing a real-time overlapped login, a function of preventing simultaneous accessing of a plurality of users and a function disconnecting a user who accesses early and connecting a user who accesses later.

6. The apparatus as recited in claim 1, wherein the first billing information processing means includes:

billing information transceiving means for receiving billing processing request information corresponding to a network re-access message, an error message for network fail and abnormal ending caused by an un-known reason and a noticing message for noticing no packet transmitted for a predetermined time from the billing information pre-processing means, transmitting the received billing processing request information to a second billing information processing means, receiving a result of billing processing from the second billing information processing means and transmitting the received result of billing processing to the billing information pre-processing means;

the second billing information processing means for analyzing billing processing request information received from the billing information transceiving means, distinguishing and processing an accounting message transmitted after normally processed, performing a function of managing billing information in response to a re-access request by un-assigning of an IP, a re-access request by a classifying process according to a time of re-accessing and a re-access request by temporal network fail in case of a network re-access message, generating basic information through coding to be used for responding a customer discontent and for generation of billing information in case of an error message for network fail and abnormal network ending caused by an un-known reason, and performing a billing management function and organizing a database with the management information in case of the noticing message for noticing no packet transmitted for a predetermined time; and billing information generating means for classifying data according to a service-charge plan based on the collected session information and the billing information, extracting and correcting unstable data from the classified data, organizing a database by transforming an amount of service used per a session to an amount of service used per an ID/session, generating the information in a formulaic format, and generating and providing basic billing information to be used for billing a cost of using services by cooperating with a billing system.

7. The apparatus as recited in claim 1, wherein the DB processing means organizes management information for billing management information by cooperating with the billing information pre-processing means, organizes real-time session information of subscriber by cooperating with the first session processing means, organizes billing history information for billing information and for error information through cooperating with the first billing information processing means, and organizes registration information database by cooperating with a custom system.

8. The apparatus as recited in claim 1, wherein the DB processing means performs various functions for responding customer discontents and processing statistics information based on information stored in a database by cooperating with a statistics processing system, a customer discontent responding system and an authentication system, and performs a function to approve or disapprove an authentication based on the stored session information in case of a pre-paid usage based service-charge.

9. A method of integrated billing management by a real-time session management, the method comprising the steps of:
    a) registering a user as a service subscriber in response to the user' request of subscribing for network service and storing and managing registration information of the user;
    b) analyzing billing processing request information received from a user terminal through a network access device, performing a real-time session management function, a session overlapping management function, and a billing information processing function based on a type of the analyzed billing processing request information in order to perform billing processing per the user without being duplicated, and transmitting the result of processing through the network access device to the user terminal; and
    c) classifying data according to service charge plans, and generating formulaic billing information based, on the session information and the billing information processed in the step b).

10. The method as recited in claim 9, further comprising the step of: d) regularly transmitting the generated billing information according to a user identification (ID) and a session in response to a billing information request of a billing system.

11. The method as recited in claim 9, further comprising the step of: e) regularly transmitting the generated billing information according to a user identification (ID) and a session in response to a billing information request of a statistics system and a customer discontent system.

12. The method as recited in claim 11, further comprising the step of: f) processing the billing information processed in the step b) in real time according to the request of the user if a billing information request from a user through a customer system, and transmitting the processed billing information to the user.

13. A computer readable recording medium storing a program that a method of integrated billing management by a real-time session management, the method comprising the steps of:
    a) registering a user as a service subscriber in response to the user' request of subscribing for network service and storing and managing registration information of the user;
    b) analyzing billing processing request information received from a user terminal through a network access device, performing a real-time session management function, a session overlapping management function, and a billing information processing function based on a type of the analyzed billing processing request information in order to perform billing processing per the user without being duplicated and transmitting the result of processing through the network access device to the user terminal; and
    c) classifying data according to service charge plans, and generating formulaic billing information, based on the session information and the billing information processed in the step b).

14. The computer readable medium as recited in claim 13, further comprising the step of: d) regularly transmitting the generated billing information according to a user identification (ID) and a session in response to a billing information request of a billing system.

15. The computer readable medium as recited in claim 13, further comprising the step of: e) regularly transmitting the generated billing information according to a user identification (ID) and a session in response to a billing information request of a statistics system and a customer discontent system.

16. The computer readable medium as recited in claim 15, further comprising the step of: f) processing the billing information processed in the step b) in real time according to the request of the user if a billing information request from a user through a customer system, and transmitting the processed billing information to the user.

* * * * *